(12) United States Patent
Kimpara et al.

(10) Patent No.: US 11,117,640 B2
(45) Date of Patent: Sep. 14, 2021

(54) ELECTRICALLY ASSISTED BICYCLE ASSIST FORCE CALCULATION METHOD, ELECTRICALLY ASSISTED BICYCLE CONTROL UNIT, ELECTRICALLY ASSISTED BICYCLE POWER UNIT, AND ELECTRICALLY ASSISTED BICYCLE

(71) Applicant: YAMAHA HATSUDOKI KABUSHIKI KAISHA, Iwata (JP)

(72) Inventors: Yuki Kimpara, Shizuoka (JP); Yusuke Nakabayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 353 days.

(21) Appl. No.: 16/286,705

(22) Filed: Feb. 27, 2019

(65) Prior Publication Data

US 2019/0263472 A1 Aug. 29, 2019

(30) Foreign Application Priority Data

Feb. 28, 2018 (JP) .............................. JP2018-034953

(51) Int. Cl.
| | |
|---|---|
| *B62M 6/50* | (2010.01) |
| *B62M 6/55* | (2010.01) |
| *B62M 6/90* | (2010.01) |
| *B62M 6/45* | (2010.01) |
| *B62J 45/20* | (2020.01) |
| *B62J 45/40* | (2020.01) |

(52) U.S. Cl.
CPC ................ *B62M 6/50* (2013.01); *B62M 6/45* (2013.01); *B62M 6/55* (2013.01); *B62M 6/90* (2013.01); *B62J 45/20* (2020.02); *B62J 45/40* (2020.02)

(58) Field of Classification Search
CPC . B62M 6/50; B62M 6/55; B62M 6/90; B62M 9/132; B62M 9/122; B63M 6/45; B62J 45/20; B62J 45/40
See application file for complete search history.

(56) References Cited

U.S. PATENT DOCUMENTS

| 5,370,200 A | * | 12/1994 | Takata .................. B60L 3/0092 180/206.4 |
|---|---|---|---|
| 8,820,459 B2 | | 9/2014 | Hashimoto et al. |
| 2018/0362115 A1 | * | 12/2018 | Tsuchizawa ............. B62M 6/50 |
| 2019/0241234 A1 | * | 8/2019 | Hattori ..................... B62J 99/00 |
| 2020/0324856 A1 | * | 10/2020 | Kim ........................ B62J 43/10 |

FOREIGN PATENT DOCUMENTS

| EP | 2 604 499 A1 | 6/2013 | |
|---|---|---|---|
| EP | 2 848 514 A1 | 3/2015 | |
| JP | 2012162174 A | * 8/2012 | ............. B62M 6/45 |
| JP | 2016-168894 A | 9/2016 | |
| WO | WO 2017135716 A1 | * 8/2017 | ............. B62M 6/50 |
| WO | WO 2020158280 A1 | * 8/2020 | ............. B62M 6/55 |

OTHER PUBLICATIONS

Define torque, Google Search, Apr. 9, 2021 (Year: 2021).*
Torque, Wikipedia, Apr. 9, 2021 (Year: 2021).*

* cited by examiner

*Primary Examiner* — Vinh Luong
(74) *Attorney, Agent, or Firm* — Keating & Bennett, LLP

(57) ABSTRACT

An electrically assisted bicycle assist force calculation method includes obtaining from a pedaling force sensor an instant pedaling force applied to a pedal, obtaining a crank advance angle of a crankshaft from an advance angle sensor having a resolution of less than 90°, and determining an assist force based on at least the instant pedaling force and the crank advance angle.

11 Claims, 6 Drawing Sheets

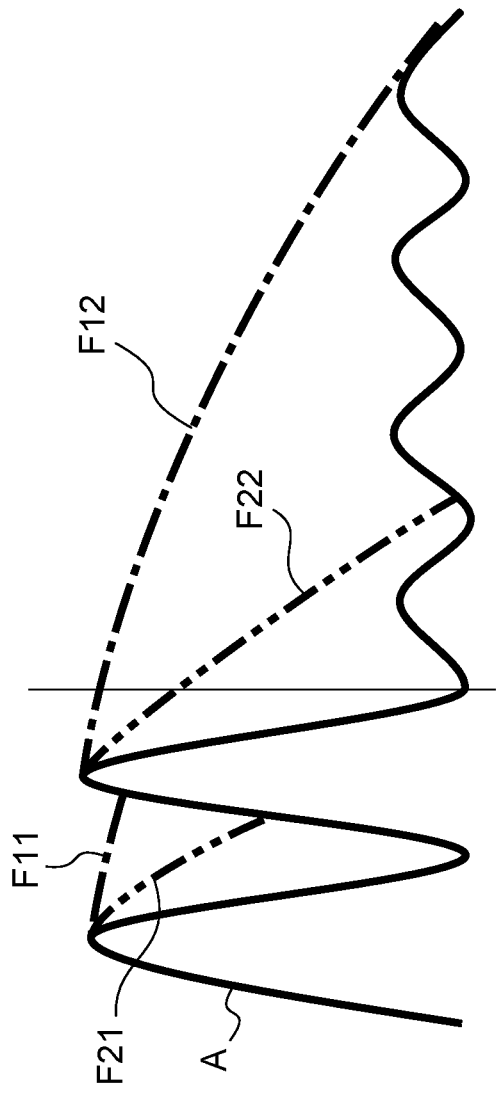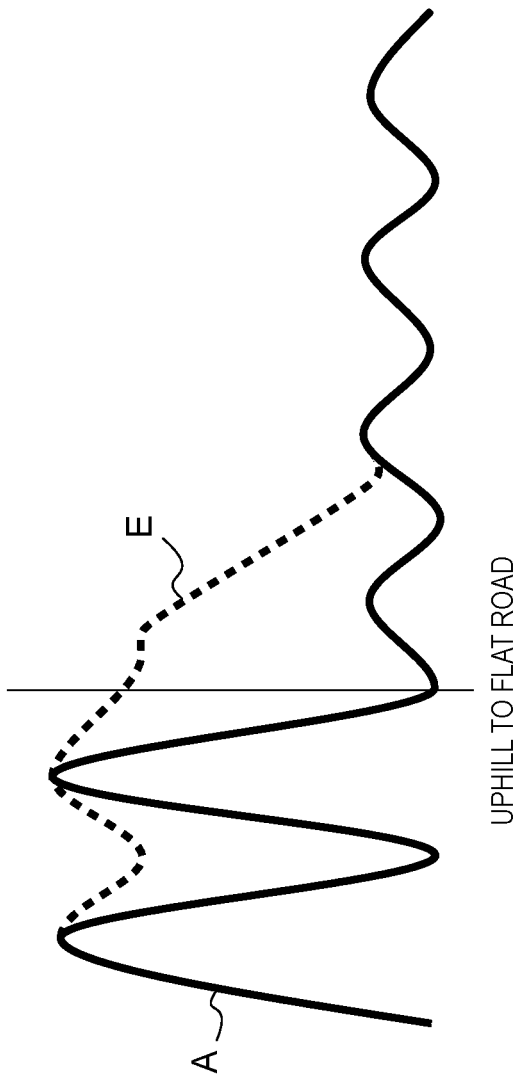

ELECTRICALLY ASSISTED BICYCLE ASSIST FORCE CALCULATION METHOD, ELECTRICALLY ASSISTED BICYCLE CONTROL UNIT, ELECTRICALLY ASSISTED BICYCLE POWER UNIT, AND ELECTRICALLY ASSISTED BICYCLE

CROSS REFERENCE TO RELATED APPLICATIONS

This application claims the benefit of priority to Japanese Patent Application No. 2018-034953 filed on Feb. 28, 2018. The entire contents of this application are hereby incorporated herein by reference.

BACKGROUND OF THE INVENTION

1. Field of the Invention

The present invention relates to an electrically assisted bicycle assist force calculation method, an electrically assisted bicycle controller, an electrically assisted bicycle power unit, and an electrically assisted bicycle.

2. Description of the Related Art

A technique described in Japanese Unexamined Patent Publication JP-A-2016-168894 is known as an electrically assisted bicycle assist force calculation method. In the calculation method described in Japanese Unexamined Patent Publication JP-A-2016-168894, an input torque is smoothed to obtain a smoothed torque, and an assist force is calculated based on the smoothed torque. In calculating a smoothed torque from an input torque, a moving average of torque values of the input torque in a variable period corresponding to one cycle of the input torque is obtained as the smoothed torque.

Depending on the scenario, the assist torque is desired to be changed quickly in response to a change in the input torque, or the assist torque is desired to be changed smoothly irrespective of a change in the input torque.

In Japanese Unexamined Patent Publication JP-A-2016-168894, how quickly the assist torque should be changed in response to a change in the input torque is controlled based on a degree referred to as a degree of smoothing. In Japanese Unexamined Patent Publication JP-A-2016-168894, the smoothing factor is reduced by reducing the number of torque values of the input torque that are used in calculating a moving average. For example, when the smoothing factor is great, a moving average obtained from torque values at four points in one cycle of the input torque is calculated as a smoothed torque. On the contrary, when the smoothing factor is small, a moving average obtained from torque values at 24 points in one cycle of the input torque is calculated as a smoothed torque.

That is, in the calculation method described in Japanese Unexamined Patent Publication JP-A-2016-168894, the smoothing factor is changed by changing the sampling time of the input torque for calculation of a moving average. An assist feeling that the cyclist feels comfortable is realized by changing the sampling time according to the pedal load.

In Japanese Unexamined Patent Publication JP-A-2016-168894, the smoothing factor is controlled according to the pedal load. For example, when the pedal load is small, the smoothing factor is set to be small. This makes it easy for the assist force to follow the change in the input torque when the input torque is increased drastically to accelerate the bicycle with the pedal load staying small. This obtains an appropriate assist force that meets the intention of the cyclist with good responsiveness.

In the calculation method described in Japanese Unexamined Patent Publication JP-A-2016-168894, however, the calculation mode has to be set so as to meet individual scenarios. For example, when the cyclist wants to accelerate the bicycle suddenly while traveling on a flat road, as described above, the smaller smoothing factor is preferable as the pedal load gets smaller. On the other hand, when the smoothing factor becomes smaller as the pedal load gets smaller, the assist force becomes weak as the pedal load gets weak at a top dead center and a bottom dead center of the pedal while the cyclist is pedaling the bicycle on an upward slope with a high pedal load. In this case, the higher smoothing factor is preferable as the pedal load increases.

In this way, to enhance the assist feeling that the cyclist feels, several assist modes need to be set to solve the issues of: whether the smoothing factor is set higher or smaller as the pedal load increases according to various scenarios or which level the smoothing factor is set at. Setting modes in anticipation of every scenario is complex and troublesome.

SUMMARY OF THE INVENTION

Preferred embodiments of the present invention provide electrically assisted bicycle assist force calculation methods, electrically assisted bicycle controllers, electrically assisted bicycle power units, and electrically assisted bicycles with each of which preferred assist forces are obtained according to a plurality of different scenarios using a simple control method.

According to a preferred embodiment of the present invention, an electrically assisted bicycle assist force calculation method includes obtaining from a pedaling force sensor an instant pedaling force applied to a pedal; obtaining a crank advance angle of a crankshaft from an advance angle sensor having a resolution of less than 90'; and determining an assist force based on at least the instant pedaling force and the crank advance angle. Additionally, other preferred embodiments of the present invention provide electrically assisted bicycle controllers able to execute the methods, electrically assisted bicycle power units, and electrically assisted bicycles.

According to preferred embodiments of the present invention, the electrically assisted bicycle assist force calculation methods, the electrically assisted bicycle controllers, the electrically assisted bicycle power units, and the electrically assisted bicycles each obtain preferred assist forces according to a plurality of different scenarios using a simple control method.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A denotes a crank advance angle correction coefficient for use in a preferred embodiment of the present invention, and FIGS. 5B to 5D denote crank advance angle correction coefficients according to modified preferred embodiments of the present invention.

FIGS. 6A and 6B show diagrams illustrating assist forces outputted when a cyclist pedals the electrically assisted bicycle from uphill to a flat road, in which FIG. 6A shows an assist force calculated by a conventional control method, and FIG. 6B shows an assist force calculated by a control method according to a preferred embodiment of the present invention.

DETAILED DESCRIPTION OF THE PREFERRED EMBODIMENTS

Hereinafter, referring to FIG. 1, preferred embodiments of the present invention will be described. Dimensions of elements in the figures do not always represent true actual dimensions of the elements and dimensional ratios of the elements.

In the following description, front, rear, left, and right refer to front, rear, left, and right as viewed from a cyclist who is seated on a seat 24 of an electrically assisted bicycle while gripping handgrips of a handlebar 23.

Firstly, an electrically assisted bicycle according to a preferred embodiment of the present invention will be described.

Figure 1:
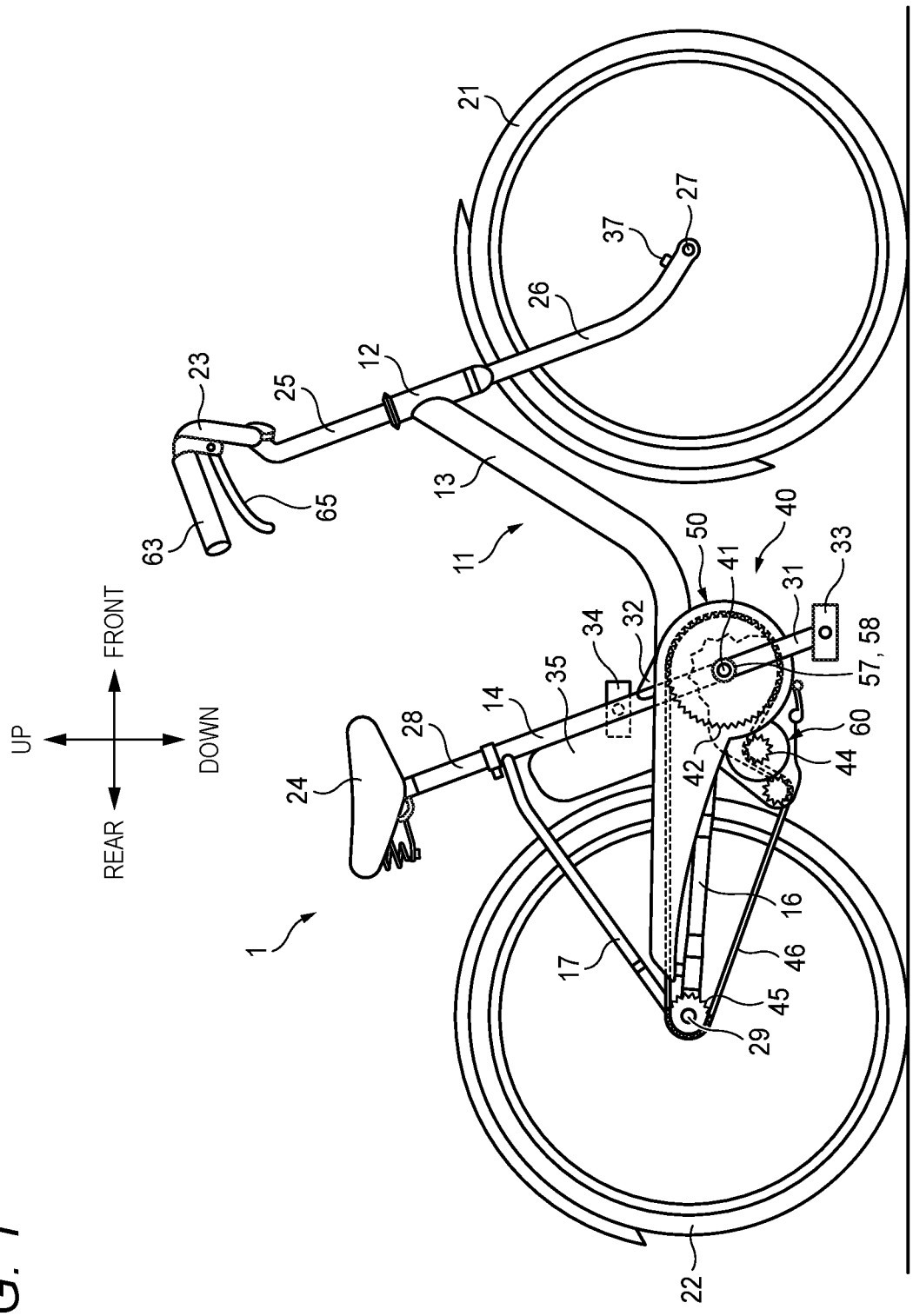
FIG. 1 is a side view of an electrically assisted bicycle according to a preferred embodiment of the present invention.

As shown in FIG. 1, an electrically assisted bicycle 1 includes pedals 33, 34 and an electric motor 60. The electrically assisted bicycle 1 is driven by a total drive torque resulting from combining a pedal torque generated by a cyclist pressing the pedals 33, 34 and a motor torque outputted from the electric motor 60. The motor torque of the electric motor 60 defines an assist torque which assists the cyclist in pressing the pedals 33, 34.

The electrically assisted bicycle 1 includes a body frame 11 which extends in a front-to-rear direction. The electrically assisted bicycle 1 also includes a front wheel 21, a rear wheel 22, a handlebar 23, a saddle seat 24, and a power unit 40.

The body frame 11 includes a head tube 12, a down tube 13, a seat tube 14, a pair of chain stays 16, and a pair of seat stays 17. The head tube 12 is disposed at a front portion of the electrically assisted bicycle 1. A front portion of the down tube 13 which extends to the rear is connected to the head tube 12. The seat tube 14 is connected to a rear portion of the down tube 13. The seat tube 14 extends obliquely upwards and rearwards from a rear end portion of the down tube 13.

A handlebar stem 25 is inserted into the head tube 12 so as to turn freely. The handlebar 23 is fixed to an upper end portion of the handlebar stem 25. A front fork 26 is fixed to a lower end portion of the handlebar stem 25. The front wheel 21 is supported rotatably at a lower end portion of the front fork 26 by an axle shaft 27. A front wheel speed sensor 37 is provided at the lower end portion of the front fork 26 to detect a vehicle speed based on rotations of the front wheel 21.

A seat post 28 is inserted into the cylindrical seat tube 14. The saddle seat 24 is provided at an upper end portion of the seat post 28.

The pair of chain stays 16 hold the rear wheel 22 therebetween from the left and right of the rear wheel 22. The pair of chain stays 16 extend from a rear portion of the down tube 13 towards a rotational center of the rear wheel 22. The pair of seat stays 17 extend from an upper portion of the seat tube 14 towards the rotational center of the rear wheel 22. The rear wheel 22 is supported rotatably at rear end portions of the chain stays 16 and the seat stays 17.

A battery 35 is disposed directly behind the seat tube 14, and the battery 35 supplies electric power to the electric motor 60 of the power unit 40. The battery 35 includes a chargeable-dischargeable rechargeable battery and a battery controller, which are not shown. The battery controller controls the charging and discharging of the rechargeable battery and monitors an output current from the battery and a residual capacity or the state of charge of the rechargeable battery.

The power unit 40 includes a crankshaft 41, a crank output shaft (not shown), a driving sprocket 42, a pedal torque detector 57, a crank rotation detector 58, the electric motor 60, and an auxiliary sprocket 44, which are all incorporated in a unit case 50 as a unit. The power unit 40 is fastened to the body frame 11 with bolts, for example.

The crankshaft 41 is rotatable and located directly below the seat tube 14. The crankshaft 41 penetrates the unit case 50 in a left-and-right direction and is supported thereon. Crank arms 31, 32 are attached to both end portions of the crankshaft 41. The pedals 33, 34 are rotatably attached to distal ends of the crank arms 31, 32, respectively. The pedal torque detector 57 detects a pedal torque which the cyclist inputs into the crankshaft 41 via the pedals 33, 34. The crank rotation detector 58 detects a rotation of the crankshaft 41 which is generated when the cyclist rotates the pedals 33, 34. The crank output shaft (not shown) preferably has a cylindrical shape which is concentric with the crankshaft 41 and is connected to the crankshaft 41 via a one-way clutch, not shown.

The drive sprocket 42 is attached to a right end of the crank output shaft (not shown). The drive sprocket 42 rotates together with the crankshaft 41. A driven sprocket 45 is provided concentrically with a rear axle shaft 29 of the rear wheel 22. The driven sprocket 45 is connected to the rear wheel 22 via a one-way clutch, not shown.

An endless chain 46 extends between and wraps around the drive sprocket 42 and the driven sprocket 45. This allows the drive sprocket 42 to rotate when the cyclist rotates the pedals 33, 34. Further, the rotation of the drive sprocket 42 is transmitted to the driven sprocket 45 by way of the chain 46 to drive the rear wheel 22.

The electric motor 60 is disposed directly behind the crank shaft 41 within the unit case 50. The auxiliary sprocket 44 is provided on an output shaft of the electric motor 60. Electric power is supplied to the electric motor 60 from the battery 35. Supplying electric power to the electric motor 60 starts the electric motor 60 to rotate. The rotation of the electric motor 60 is transmitted to the chain 46 by way of the auxiliary sprocket 44. In this way, when electric power is supplied to the electric motor 60, motor torque is generated in the electric motor 60. The motor torque is transmitted to the rear wheel 22 via the chain 46.

Handlebar grips 63 are provided at left and right end portions of the handlebar 23. The handlebar grips 63 extend substantially in the front-to-rear direction. The cyclist is able to grip the handlebar grips 63.

Brake levers 65 are provided near the handlebar grips 63. When the cyclist operates the right brake lever 65 with his or her right hand, a braking force is applied to the front wheel 21. When the cyclist operates the left brake lever 65 with his or her left hand, a braking force is applied to the rear wheel 22.

In the electrically assisted bicycle 1 described above, the electric motor 60 is controlled by a controller 100 to apply a motor torque to the rear wheel 22.

Figure 2:
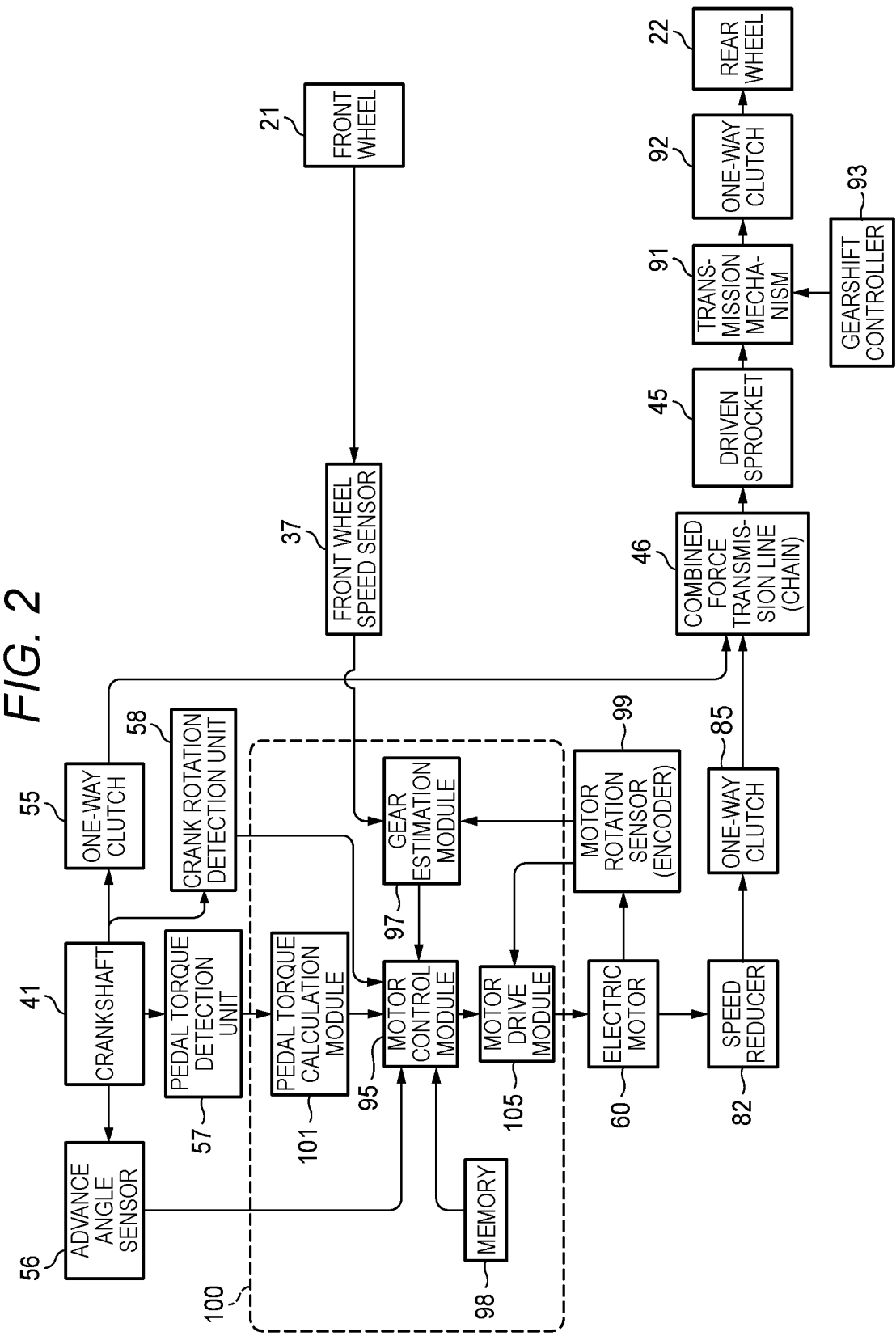
FIG. 2 is a block diagram showing the function of the electrically assisted bicycle according to a preferred embodiment of the present invention.

FIG. 2 is a block diagram showing various functions of the electrically assisted bicycle 1. As shown in FIG. 2, the controller 100 includes a pedal torque calculator 101, a motor controller 95, a motor driver 105, a gear estimator 97, and a memory 98.

Next, a power transmission line will be described.

When the cyclist presses the pedals 33, 34 to rotate the crankshaft 41, the rotation of the crankshaft 41 is transmitted to the chain 46 by way of a one-way clutch 55. The one-way clutch 55 transmits a forward rotation of the crankshaft 41 to the chain 46 but does not transmit a reverse rotation of the crankshaft 41 to the chain 46.

The rotation of the chain 46 is transmitted to the driven sprocket 45 of the rear wheel 22. The rotation of the driven sprocket 45 is transmitted to the rear wheel 22 by way of a transmission 91 and a one-way clutch 92.

The transmission 91 is able to change speed gears in response to an operation of a gearshift controller 93 by the cyclist. The one-way clutch 92 transmits the rotation of the driven sprocket 45 to the rear wheel 22 only when the rotation speed of the driven sprocket 45 is faster than the rotation speed of the rear wheel 22. When the rotation speed of the driven sprocket 45 is slower than the rotation speed of the rear wheel 22, the one-way clutch 92 does not transmit the rotation of the driven sprocket 45 to the rear wheel 22.

The rotation of the electric motor 60 is transmitted to a one-way clutch 85 by way of a speed reducer 82. The one-way clutch 85 transmits only a rotation of the electric motor 60 in a direction in which the speed reducer 82 rotates the chain 46 forward but does not transmit a rotation of the electric motor 60 in a direction in which the seed reducer 82 rotates the chain 46 backward.

In this way, in the electrically assisted bicycle 1 according to a preferred embodiment of the present invention, the pedal torque applied to the crankshaft 41 and the motor torque of the electric motor 60 are combined together at the chain 46.

Next, signal lines will be described.

When the cyclist rotates the crankshaft 41, the pedal torque detector 57 provided on the bicycle 1 generates a signal corresponding to a pedal torque applied to the crankshaft 41. The pedal torque detector 57 inputs the signal into the pedal torque calculator 101.

The pedal torque calculator 101 converts the signal from the pedal torque detector 57 into the pedal torque exerted on the pedals 33, 34 by the cyclist. The pedal torque calculator 101 inputs a value of the pedal toque into the motor controller 95.

The crank rotation detector 58 includes a sensor that detects a phase of the crankshaft 41. The crank rotation detector 58 generates a signal corresponding to the phase of the crankshaft 41. The crank rotation detector 58 inputs the signal into the motor controller 95.

The front wheel speed sensor 37 transmits a signal which indicates a rotation speed of the front wheel 21 to the gear estimator 97. The gear estimator 97 estimates a gear from the rotation speed of the front wheel 21 and transmits this information to the motor controller 95.

A motor rotation sensor 99 is provided on the electric motor 60. The motor rotation sensor 99 detects a revolution speed of the electric motor 60 and transmits the detected revolution speed to the gear estimator 97 and the motor driver 105.

The motor controller 95 calculates a command value to apply an appropriate assist force by a control method, which will be described below and transmits it to the motor driver 105.

The motor driver 105 supplies electric power corresponding to the command value to the electric motor 60 from the battery 35 based on the command value from the motor controller 95. This drives the electric motor 60 to which the electric power is supplied to generate a predetermined motor torque.

The electrically assisted bicycle 1 according to a preferred embodiment of the present invention includes an advance angle sensor 56 as shown in FIG. 2. The advance angle sensor 56 detects a variation (angle) in the rotational angle of the crankshaft 41 from one time to another time. A sensor having a resolution of less than 90° may be used as the advance angle sensor 56, for example. The resolution of the advance angle sensor 56 is preferably 60 degrees or smaller and is more preferably 30° or smaller, 15° or smaller, 10° or smaller, 5° or smaller, or 1° or smaller, for example. The advance angle sensor 56 outputs a variation in the rotational angle of the crankshaft 41 to the motor controller 95.

Figure 3:
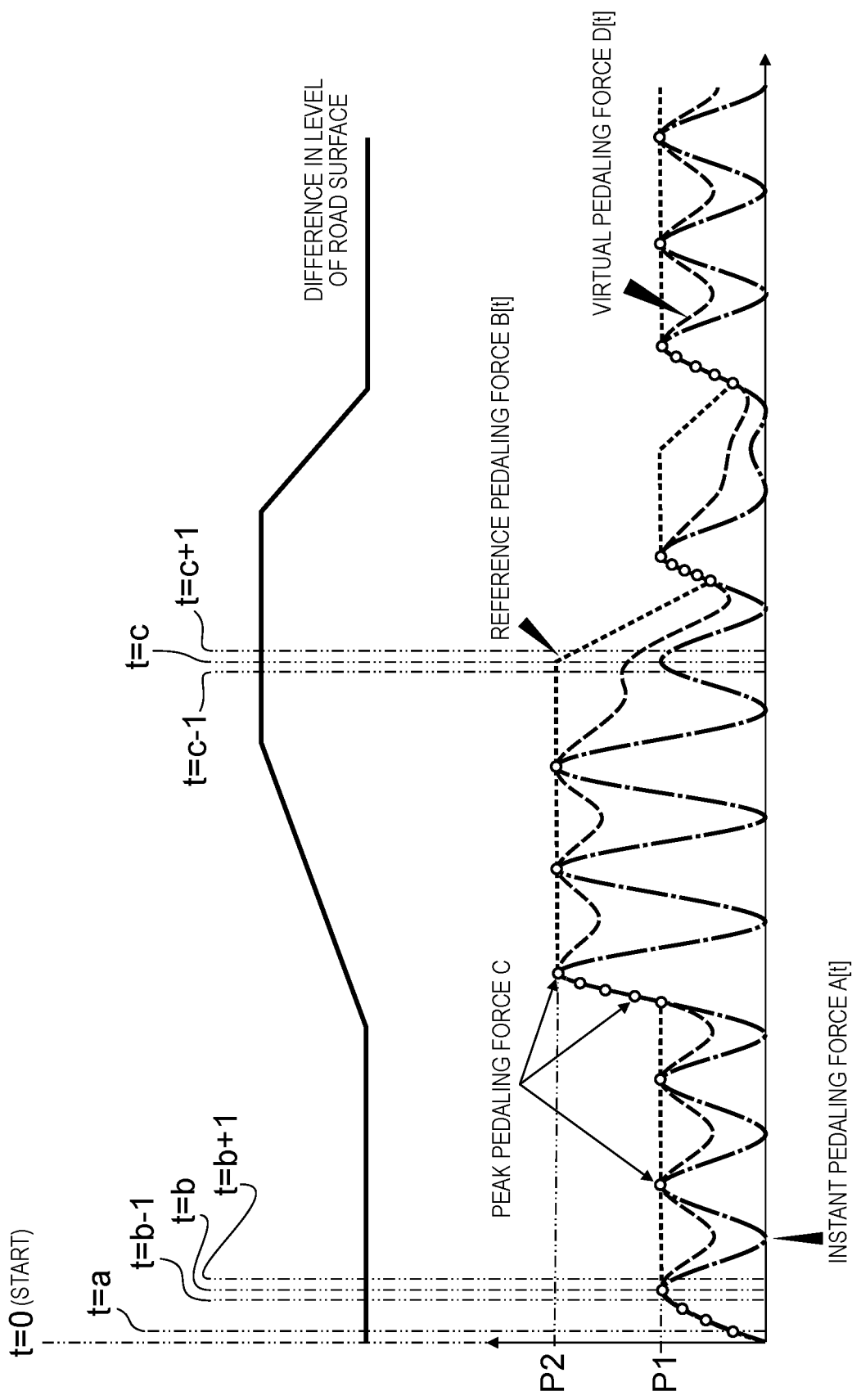
FIG. 3 is a conceptual diagram representing a change in a virtual pedaling force that a controller according to a preferred embodiment of the present invention outputs according to a traveling scenario.
Figure 5A:
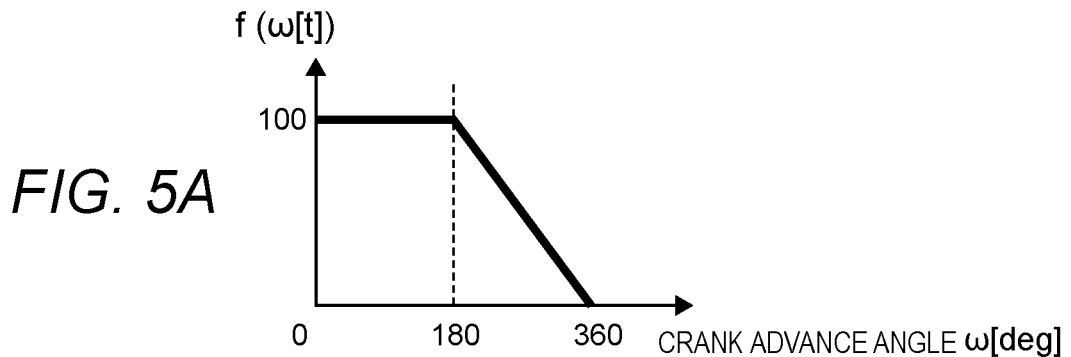
FIGS. 5A to 5D show graphs illustrating examples of crank advance angle correction coefficients.
Figure 5B:
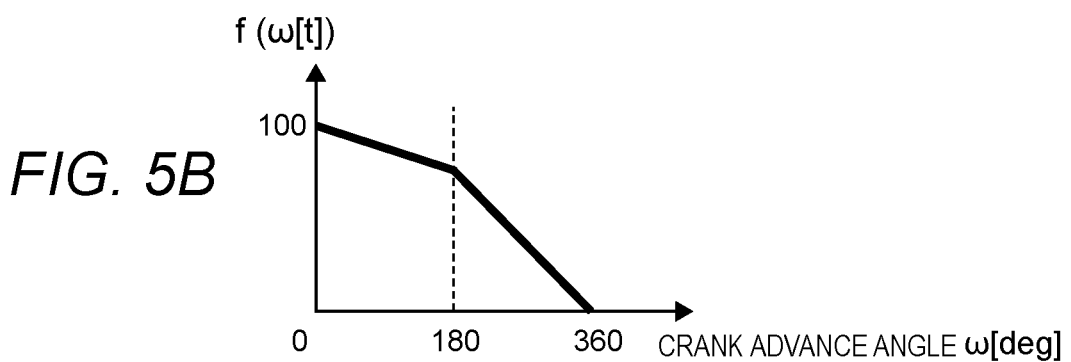

FIG. 3 is a conceptual diagram representing a change in a virtual pedaling force that the controller 100 according to a preferred embodiment of the present invention outputs according to a traveling scenario. FIG. 3 is the conceptual diagram of the virtual pedaling force according to the traveling scenario. FIG. 5A is a graph showing an example of a crank advance angle correction coefficient. An electrically assisted bicycle assist force calculation method that is executed by the controller 100 will be described with reference to FIGS. 3 and 5A.

A summary of the virtual pedaling force that the controller 100 outputs will be described with reference to FIG. 3. The motor controller 95 of the controller 100 calculates a virtual pedaling force before calculating an assist force. The motor controller 95 outputs a command value to the motor controller 105 so that an assist force according to a virtual pedaling force, for example, an assist force proportional to a virtual pedaling force is outputted from the electric motor 60.

The motor controller 95 calculates a virtual pedaling force $D[t]$ based on an advance angle sensor output $\theta[t]$, a crank advance angle $\omega[t]$, an instant pedaling force $A[t]$, a reference pedaling force $B[t]$, and a peak pedaling force C. The advance angle sensor output $\theta[t]$, the crank advance angle $\omega[t]$, the instant pedaling force $A[t]$, the reference pedaling force $B[t]$, and the virtual pedaling force $D[t]$ are values that change with time.

The instant pedaling force $A[t]$ is a value that the pedal torque calculator 101 inputs into the motor controller 95. The crank advance angle $\omega[t]$ is an angle that is calculated according to the advance angle sensor output $\theta[t]$. The crank advance angle $\omega[t]$ is an angular advance amount of the crankshaft 41 from an angular position of the crankshaft 41 at which the instant pedaling force $A[t]$ becomes a maximum point. The crank advance angle $\omega[t]$ is reset at 0° every time the instant pedaling force $A[t]$ becomes a maximum point. For example, when the cyclist pedals on a flat road with a constant leg force, a point where the instant pedaling force $A[t]$ becomes a maximum point is a point in time when the position of the pedal 33 rotates 90° from its top dead center or bottom dead center. Alternatively, when the cyclist stops rotating the pedal 33 immediately after he or she starts rotating the pedal 33, there may be a case in which an instant pedaling force A[t] resulting immediately before the cyclist stops rotating the pedal becomes a maximum point.

The reference pedaling force B[t] is a value that is used to calculate a virtual pedaling force D[t]. The reference pedaling force B[t] is a value that is obtained based on the peak pedaling force C and the crank advance angle ω[t]. This will be described in detail as below.

The virtual pedaling force D[t] is obtained based on the instant pedaling force A[t], the peak pedaling force C, and the crank advance angle ω[t]. The virtual pedaling force D[t] is obtained based on the reference pedaling force B[t] that is obtained from the peak pedaling force C and the crank advance angle ω[t]. In the present preferred embodiment, the virtual pedaling force D[t] is outputted as a value that results from combining the instant pedaling force A[t] and the reference pedaling force B[t].

Figure 4:
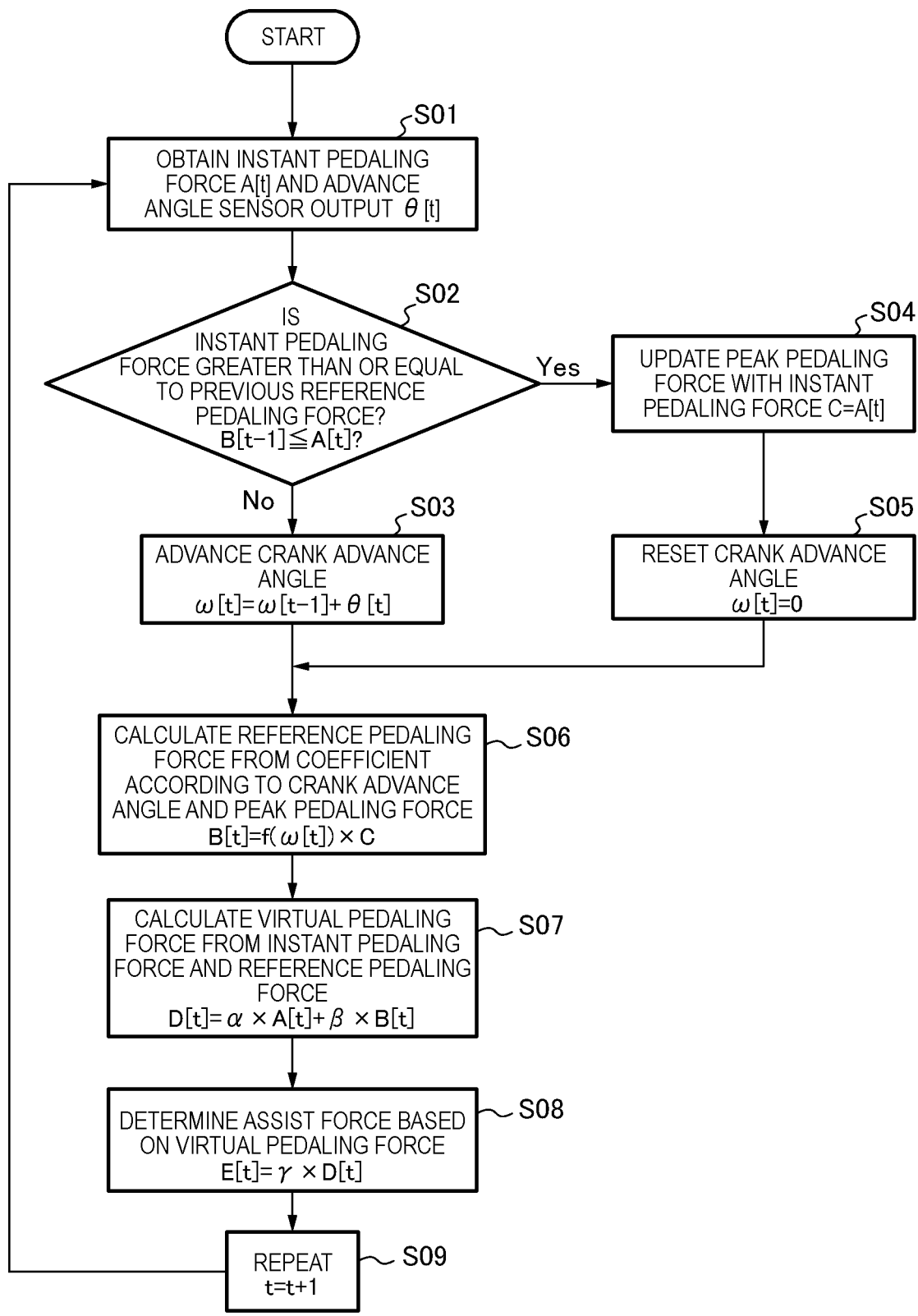
FIG. 4 is a flow chart of a process that the controller executes according to a preferred embodiment of the present invention.

As shown in FIG. 4, firstly, the motor controller 95 of the controller 100 obtains an instant pedaling force A[t] and an advance angle sensor output θ[t] (Step S01). The motor controller 95 obtains an instant pedaling force A[t] from the pedal torque calculator 101 and obtains an advance angle sensor output θ[t] from the advance angle sensor 56.

Next, the motor controller 95 determines whether or not the instant pedaling torque A[t] is greater than or equal to the previous reference pedaling force B[t−1] (Step 02).

When it is determined that the instant pedaling force A[t] is smaller than the previous reference pedaling force B[t−1] (Step 02: No), the motor controller 95 advances the crank advance angle ω[t] (Step 03) and proceeds to Step S06.

On the other hand, when it is determined that the instant pedaling force A[t] is greater than or equal to the previous reference force B[t−1] (Step S02: Yes), the motor controller 95 updates the peak pedaling force C with the instant pedaling force A[t] (C=A[t]) (Step S04). Further, the motor controller 95 resets the crank advance angle ω[t] (ω[t]=0) (Step S05) and proceeds to step S06.

In Step S06, the motor controller 95 obtains a reference pedaling force B[t] from the crank advance angle correction coefficient f(ω[t]) and the peak pedaling force C. The crank advance angle correction f(ω[t]) is a coefficient according to the crank advance angle ω[t]. The crank advance angle correction coefficient f may be determined, for example, as shown in FIG. 5A. As shown in FIG. 5A, the crank advance angle correction coefficient f(ω[t]) is set so that the crank advance angle correction coefficient f(ω[t]) maintains a value of 1 until the crank advance angle ω[t] becomes a first predetermined crank advance angle (in the example shown in the figure, 180°) from 0°, then decreases rectilinearly until the crank advance angle ω[t] becomes a second predetermined crank advance angle (in the example shown in the figure, 360°), and reaches and is maintained at 0 from the second predetermined crank advance angle. That is, the reference pedaling force B[t] is a value that exhibits the peak pedaling force C until the crankshaft 41 reaches the first predetermined crank advance angle and decreases thereafter.

When obtaining the reference pedaling force B[t] in Step S06, the motor controller 95 calculates a virtual pedaling force D[t] from the instant pedaling force A[t] and the reference pedaling force B[t] (Step S07). The virtual pedaling force D[t] is calculated from an expression: D[t]=α× A[t]+β×B[t], wherein α and β, are arbitrary constants.

The motor controller 95 determines an assist force E[t] based on the virtual pedaling force D[t] (Step S08). The assist force E[t] is calculated from an expression: E[t]=γ× D[t], wherein γ is an arbitrary constant. When having executed the processes from Step S01 to Step S08, the motor controller 95 executes Step S01 repeatedly for the next time.

The instant pedaling force A[t] is a value that changes with time and defines a component that changes quickly the virtual pedaling force D[t] to a change in the pedaling force of the cyclist. In contrast with this, the reference pedaling force B[t] is a value at which a maximum instant pedaling force A[t] near a certain time is kept as it is for a certain period of time and defines a component that does not change the virtual pedaling force D[t] to a change in the pedaling force of the cyclist. The virtual pedaling force D[t] outputs an assist force E[t] that changes with the change in the pedaling force of the cyclist while following the pedaling force change as required by combining the instant pedaling force A[t] and the reference pedaling force B[t].

Returning to FIG. 3, the assist force calculation method will be described specifically for each traveling scenario.

FIG. 3 shows how the instant pedaling force A[t], the reference pedaling force B[t], the peak pedaling force C, and the virtual pedaling force D[t] change when the cyclist starts the electrically assisted bicycle 1 and pedals it uphill, a flat road, a downhill, and a flat road. In the following description, it is assumed that α and β are 0.5, and γ is 1.

Firstly, a state at a time "a" in FIG. 3 will be described. The time "a" shows a state resulting immediately after the cyclist starts the electrically assisted bicycle 1 on a flat road. As shown in FIG. 4, in Step 01, the motor controller 95 obtains an instant pedaling force A[a] and an advance angle sensor output θ[a] at the time "a".

In Step 02, the motor controller 95 compares the previous reference pedaling force B[a−1] with the instant pedaling force A[a]. Since this point occurs immediately after the start of the electrically assisted bicycle 1, the previous reference pedaling force B[a−1] is zero. Consequently, the instant pedaling force A[a] is greater than or equal to the reference pedaling force B[a−1] (Step S02: Yes).

In Step S04, the motor controller 95 updates the peak pedaling force C with the instant pedaling force A[a].

In Step 05, the motor controller 95 resets the crank advance angle ω[a] to 0°.

In Step 06, the motor controller 95 calculates a reference pedaling force B[a]. Since ω[a] is 0°, according to FIG. 5A, the crank advance angle correction coefficient f(ω[t]) is 1. Then, B[a]=1×A[a]=A[a].

In Step 07, the motor controller 95 calculates a virtual pedaling force D[a].

$$D[a]=0.5 \times A[a]+0.5 \times B[a]=0.5 \times A[a]+0.5 \times A[a]=A[a].$$

In Step 08, the motor controller 95 calculates an assist force E[a].

$$E[a]=1 \times D[a]=1 \times A[a]=A[a].$$

That is, when starting the electrically assisted bicycle 1, an assist force is obtained which changes at the same time as the pedaling force of the cyclist changes.

Next, a state at a time "b" in FIG. 3 will be described. The time "b" is a time when the instant pedaling force A[t] becomes a maximum point P1 after the cyclist starts the electrically assisted bicycle 1 on the flat road. The time "b" is a point in time when the crankshaft 41 rotates about 90° from its top dead center or bottom dead center.

As shown in FIG. 4, in Step S01, the motor controller 95 obtains an instant pedaling force A[b]=P1 and an advance angle sensor output θ[b] at the time b.

In Step 02, the motor controller 95 compares the previous reference pedaling force B[b−1] with the instant pedaling force A[b]. Since the instant pedaling force exhibits the maximum point P1 at the time b, the instant pedaling force A[b] (the value P1) is greater than or equal to the previous reference pedal force B[b−1] (Step S02: Yes).

In Step 04, the motor controller 95 updates the peak pedaling force C with the instant pedaling force A[b] (the value P1). That is, C=P1.

In Step 05, the motor controller 95 resets the crank advance angle ω[b] to 0°.

In Step 06, the motor controller 95 calculates a reference pedaling force B[b]. Since ω[a] is 0°, according to FIG. 5A, the crank advance angle correction coefficient f(ω[t]) is 1. Then, B[b]=1×C=P1.

In Step 07, the motor controller 95 calculates a virtual pedaling force D[b].

$$D[b]=0.5\times A[b]+0.5\times B[b]=0.5\times P1+0.5\times P1=P1.$$

In Step 08, the motor controller 95 calculates an assist force E[b].

$$E[b]=1\times D[b]=1\times P1=P1.$$

Next, a state at a time "b+1" in FIG. 3 will be described. At the time "b+1", the instant pedaling force A[t] decreases after it reaches the maximum point P1. The time "b+1" is a point in time when the crankshaft 41 rotates about 18° from the time t. That is, θ[b+1]=18[°].

As shown in FIG. 4, in Step S01, the motor controller 95 obtains an instant pedaling force A[b+1] at the time "b+1" and an advance angle sensor output θ[b+1]=18[°].

In Step 02, the motor controller 95 compares the previous reference pedaling force B[b] with the instant pedaling force A[b+1]. Here, the previous reference pedaling force B[b] is P1 of the peak pedaling force C. The instant pedaling force A[b+1] is smaller than the previous reference pedaling force B[b]=P1 (Step 02: No).

In Step 03, the motor controller 95 advances the crank advance angle ω[t]. That is, θ[b+1]=ω[b]+θ[b+1]=0+18=18[°].

In Step 06, the motor controller 95 calculates a reference pedaling force B[b+1]. Since θ[b+1] is 18°, according to FIG. 5A, the crank advance angle correction coefficient f(ω[t]) is 1. Then, B[b+1]=1×C=P1.

In Step 07, the motor controller 95 calculates a virtual pedaling force D[b+1].

$$D[b+1]=0.5\times A[b+1]+0.5\times B[b+1]=0.5\times A[b+1]+0.5\times P1.$$

In Step 08, the motor controller 95 calculates an assist force E[b+1].

$$E[b+1]=1\times D[b+1]=0.5\times A[b+1]+0.5\times P1.$$

That is, an assist force resulting from combining the instant pedaling force A[t] and the peak pedaling force C resulting immediately before the time "b+1" is obtained at the time "b+1". In the present preferred embodiment, since α=β=0.5, an assist force is obtained which is an average of the instant pedaling force A[t] and the peak pedaling force C immediately before the time "b+1". That is, at the time "b+1", even though the instant pedaling force A[t] decreases, the assist force does not always follow the decrease of the instant pedaling force A[t] 100%, such that an assist feeling is obtained which makes the cyclist have a feeling of smooth riding. The assist force of the combination of the instant pedaling force A[t] and the peak pedaling force C immediately before is obtained within the range of the first predetermined crank advance angle (in the present preferred embodiment, 180°) from the point in time when the instant pedaling force A[t] becomes the maximum point (=the peak pedaling force).

Next, a state at the time "c" will be described. The time "c" is a time when the instant pedaling force A[t] becomes the maximum point P1 after the cyclist pedals the electrically assisted bicycle 1 from uphill to the flat road. It is assumed that the crankshaft 41 rotates 18° from t="c−1" to t="c", and the crankshaft 41 rotates another 18° from t="c" to t="t+1". That is, θ[c]=18[°]. The peak pedaling force C has a maximum point P2 before the time "c", and it is assumed that the crankshaft 41 rotates 162° between a point in time when P2 is reached at the time c−1. That is, ω[c−1]=162[°].

As shown in FIG. 4, in Step S01, the motor controller 95 obtains an instant pedaling force A[c]=P1 at the time "c" and an advance angle sensor output θ[c]=18[°].

In Step 02, the motor controller 95 compares the previous reference pedaling force B[c−1] with the instant pedaling force A[c]. Here, the previous reference pedaling force B[c−1] is P2 of the peak pedaling force C. The instant pedaling force A[c] is smaller than the previous reference pedaling force B[c−1] (Step 02: No).

In Step 03, the motor controller 95 advances the crank advance angle ω[t]. That is, ω[c]=ω[c−1]+θ[c]=162+18=180[°].

In Step 06, the motor controller 95 calculates a reference pedaling force B[c]. Since ω[c] is 180°, according to FIG. 5A, the crank advance angle correction coefficient f(ω[t]) is 1. Then, B[c]=1×C=P2.

In Step 07, the motor controller 95 calculates a virtual pedaling force D[c].

$$D[c]=0.5\times A[c]+0.5\times B[c]=0.5\times A[c]+0.5\times P2.$$

In Step 08, the motor controller 95 calculates an assist force E[c].

$$E[c]=1\times D[c]=0.5\times A[c]+0.5\times P2.$$

Next, a state at the time "c+1" will be described.

As shown in FIG. 4, in Step S01, the motor controller 95 obtains an instant pedaling force A[c+1] at the time "c+1" and an advance angle sensor output θ[c+1]=18[°].

In Step 02, the motor controller 95 compares the previous reference pedaling force B[c] with the instant pedaling force A[c+1]. Here, the previous reference pedaling force B[c] is P2. The instant pedaling force A[c+1] is smaller than the previous reference pedaling force B[c]=P2 (Step 02: No).

In Step 03, the motor controller 95 advances the crank advance angle ω[t]. That is, ω[c+1]=ω[c]+θ[c+1]=180+18=198[°].

In Step 06, the motor controller 95 calculates a reference pedaling force B[c+1]. Since ω[c+1] is 198°, according to FIG. 5A, the crank advance angle correction coefficient f(ω[t]) is 0.9. Then, B[c+1]=0.9×C=0.9×P2.

In Step 07, the motor controller 95 calculates a virtual pedaling force D[c+1].

$$D[c+1]=0.5\times A[c+1]+0.5\times B[c+1]=0.5\times A[c+1]+0.45\times P2.$$

In Step 08, the motor controller 95 calculates an assist force E[c+1].

$$E[c+1]=1\times D[c+1]=0.5\times A[c+1]+0.45\times P2.$$

In this way, when the rotational angle of the crankshaft 41 from the point in time when the instant pedaling force A[t] becomes the maximum point exceeds the first predetermined value (in the present preferred embodiment, 180°), the influence of the reference pedaling force B[t] on the virtual pedaling force D[t] is reduced. This provides an assist force that matches the change in the pedaling force of the cyclist as the cyclist rotates the crankshaft 41.

A scenario at the time "c+1" will be described in more detail. FIGS. 6A and 6B show conceptual diagrams illustrating a change in the instant pedaling force A[t] and a change in the assist force when the cyclist pedals the electrically assisted bicycle 1 from uphill to a flat road. FIG. 6A shows an assist force obtained by the method described in Japanese Unexamined Patent Publication JP-A-2016-168894, and FIG. 6B shows an assist force E obtained by a method according to a preferred embodiment of the present invention.

Curves F11, F12 in FIG. 6A indicate an assist force that can be obtained by the method that is executed when a smooth assist feeling is desired to be provided to the cyclist in Japanese Unexamined Patent Publication JP-A-2016-168894. Specifically, it is the method that is executed by setting a small smoothing factor. As indicated by curve F11, although a smooth assist feeling is provided when the cyclist pedals the electrically assisted bicycle uphill, as indicated by curve F12, when the cyclist pedals the electrically assisted bicycle onto a flat road, a long period of time when an excessive assist force relative to the instant pedaling force is outputted.

Curves F21, F22 in FIG. 6A indicate an assist force that is obtained by the method that is executed with a view to shortening the period of time when the excessive assist force is outputted. Specifically, it is the method that is executed by setting a high smoothing factor. As indicated by F22, although the period of time when the excessive assist force is outputted can be shortened, as indicated by curve F21, the assist force follows the instant pedaling force excessively when the cyclist pedals the electrically assisted bicycle uphill, such that no smooth assist force is provided.

Then, in Japanese Unexamined Patent Publication JP-A-2016-168894, an assist force has to be calculated by setting a smoothing factor that changes according to the traveling scenario. Specifically, in the method of Japanese Unexamined Patent Publication JP-A-2016-168894, the smoothing factor needs to be switched over by obtaining outputs of various sensors configured to detect traveling conditions of the electrically assisted bicycle such as whether the cyclist pedals the electrically assisted bicycle uphill or on flat road, and taking these pieces of information into consideration. That is, in the method of Japanese Unexamined Patent Publication JP-A-2016-168894, inputs from the various sensors are necessary, and a traveling scenario needs to be identified from the inputs from the various sensors, and further, a plurality of modes (for example, smoothing factors) need to be set according to the traveling scenarios. A processor having a high performance may become necessary to execute the complex process like that described above.

In contrast with the above, as shown in FIG. 6B, according to the assist force calculation method of a preferred embodiment of the present invention, the virtual pedaling force is calculated based on the instant pedaling force and the crank advance angle, and the assist feeling that differs or changes according to the traveling scenarios are provided to the cyclist by using the constant calculation formula at all times.

That is, when the pedals are pressed with a great force, the assist force that changes as the pedaling force changes is provided such that when a great assist force is requested, the request is met without any delay.

Alternatively, when the cyclist pedals the electrically assisted bicycle 1 on the flat road, the assist force that changes as required as the instant pedaling force changes is provided by using the value resulting from combining the instant pedaling force and the reference pedaling force according to $\alpha$ and R, such that a smooth assist feeling is provided to the cyclist.

Further, although the assist feeling that differs or changes according to the traveling scenarios are provided to the cyclist, the outputs from the various sensors that detect the traveling condition of the bicycle do not have to be obtained as done in Japanese Unexamined Patent Publication JP-A-2016-168894, and the traveling scenario does not have to be identified. Further, the plurality of modes corresponding to the various traveling scenarios do not have to be set. In this way, according to the assist force calculation method of a preferred embodiment of the present invention, the preferred assist forces corresponding to the different scenarios are obtained by a simple control method.

The assist feeling may be controlled by the crank advance angle correction coefficient $f(\omega[t])$ shown in FIGS. 5A to 5D.

In the example shown in FIG. 5A, the second predetermined crank advance angle, at which the crank advance angle correction coefficient is 0, is 360°; however, the second predetermined crank advance angle may be set to an arbitrary value within, for example, a range from 90° to 1080°. For example, the second predetermined crank advance angle may be set at 1080°, an excessive assist force is prevented from being outputted before the cyclist pedals the electrically assisted bicycle 1 from uphill to the flat road such that the crankshaft 41 rotates three rotations.

In the example shown in FIG. 5A, the first predetermined crank advance angle, at which the crank advance angle correction coefficient starts to be decreased from 1, is 180°; however, the first predetermined crank advance angle may be set to an arbitrary value within, for example, a range from 90° to 720°.

In the example shown in FIG. 5A, there is provided the period of time when the crank advance angle correction coefficient is maintained at the value of 1, but is not limited to this. As shown, for example, in FIG. 5B, the crank advance angle correction coefficient may be reduced immediately after the crank advance angle is 0° so that the crank advance angle correction coefficient continues to be reduced from the first predetermined crank advance angle to the second predetermined crank advance angle at a gradient that is different from the gradient to the first predetermined crank advance angle. The gradient to the first predetermined crank advance angle may be smaller or greater than the gradient from the first predetermined crank advance angle to the second predetermined crank advance angle.

Figure 5C:
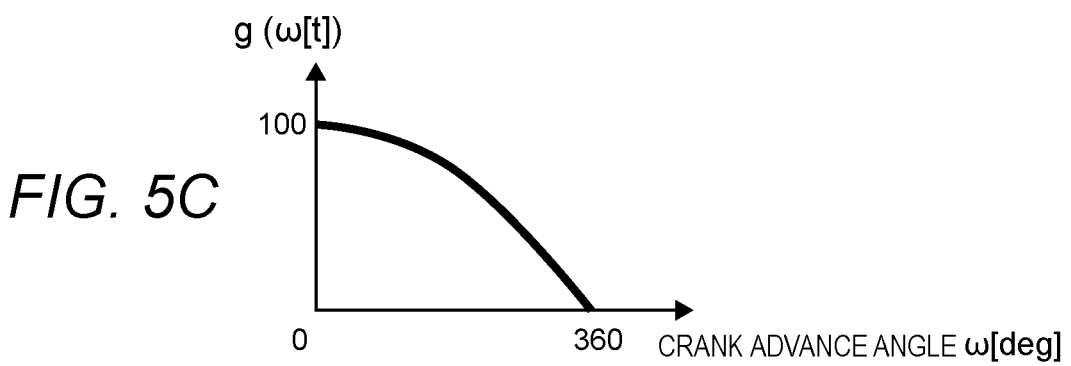

Alternatively, as shown in FIG. 5C, the crank advance angle correction coefficient may be reduced to have a value of 0 in such a way as to provide a smooth curve immediately after the crank advance angle is 0°.

Figure 5D:
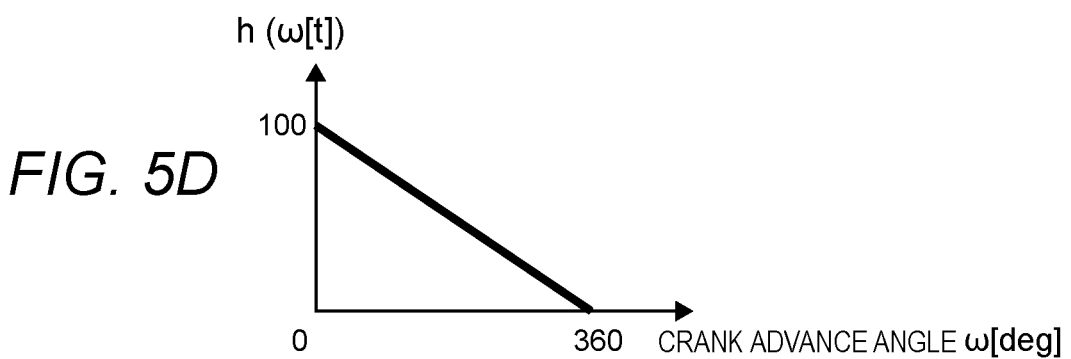

Further, as shown in FIG. 5D, the crank advance angle correction coefficient may be reduced rectilinearly to have a value of 0 immediately after the crank advance angle is 0°. In FIGS. 5A to 5D, the second predetermined crank advance angle, at which the crank advance angle correction coefficient is 0, may be set to an arbitrary value within the range from 90° to 1080°, as described above.

In addition, the assist feeling is able to be controlled by controlling the values of $\alpha$ and $\beta$ in the expression: $D[t] = \alpha \times A[t] + \beta \times B[t]$. For example, when a ratio of $\alpha/\beta$ is increased, the effect of the instant pedaling force becomes great. Then, an assist force is outputted which changes quickly as the pedaling force of the cyclist changes. Alternatively, when the ratio of α/β is reduced, the effect of the reference pedaling force becomes great. Then, an assist force is outputted which changes smoothly as the pedaling force of the cyclist changes. The ratio of α/β, may be controlled at the time of shipment of the electrically assisted bicycle according to the characteristics of the electrically assisted bicycle as a commercial product, or the electrically assisted bicycle may be configured so that the ratio of α/β, may be changed according to an operation by the cyclist.

Alternatively, the ratio of α/β, may be controlled according to the peak pedaling force C. For example, dependency of the virtual pedaling force on the reference pedaling force may become greater as the peak pedaling force C increases, or, on the contrary, the dependency of the virtual pedaling force on the reference pedaling force may become smaller as the peak pedaling force C increases. Alternatively, the ratio of α/β, may be controlled according to a pedaling cadence of the electrically assisted bicycle 1. For example, the dependency of the virtual pedaling force on the reference pedaling force may become greater as the pedaling cadence decreases, or, on the contrary, the dependency of the virtual pedaling force on the reference pedaling force may become smaller as the pedaling cadence decreases.

A ratio of the dependency of the virtual pedaling force on the reference pedaling force (ratio of β/(α+β)) may change according to at least one of bicycle speed, gradient angle, gear ratio, cyclist's weight, acceleration, traveling mode (assist mode), state of charge of battery, and circuit board temperature. That is, the relationship between the coefficient α and the coefficient β, may change according to at least one of bicycle speed, gradient angle, gear ratio, cyclist's weight, acceleration, traveling mode (assist mode), state of charge of battery, and circuit board temperature.

According to preferred embodiments of the present invention described above, while the bicycle is described in which the assist force is applied to the rear wheel 22, the assist force may be applied to the front wheel 21.

In addition, while a preferred embodiment of the present invention is described above in which the virtual pedaling force D[t] is obtained based on the instant pedaling force A[t] and the crank advance angle θ[t] and then, the assist force E[t] is obtained from the virtual pedaling force D[t], the present invention is not limited to this preferred embodiment. For example, a virtual motor output may be obtained by multiplying the instant pedaling force A[t] by an appropriate coefficient, and then, an assist force is calculated based on the virtual motor output and the crank advance angle θ[t].

While the preferred embodiment shown in FIG. 2 is described as including both the advance angle sensor 56 and the crank rotation detector 58, for example, the crank rotation detector 58 may be omitted, and a rotation speed of the crankshaft 41 is calculated from the advance angle sensor 56. Although a general sensor having a resolution of 90° or greater may be used as the rotation detector 58 to calculate a rotation speed of the crankshaft 41, a sensor having a resolution of at least less than 90° may be used as the advance angle sensor 56. Consequently, when the advance angle sensor 56 and the crank rotation detector 58 are a common sensor, it should be noted that a sensor having a resolution of less than 90° is preferably used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically assisted bicycle assist force calculation method comprising:
   obtaining from a pedaling force sensor an instant pedaling force applied to a pedal;
   obtaining a crank advance angle of a crankshaft from an advance angle sensor having a resolution of less than 90°;
   determining an assist force based on at least the instant pedaling force and the crank advance angle;
   setting a maximum point of the instant pedaling force as a peak pedaling force;
   defining an advance angle amount of the crankshaft from an angle at which the peak pedaling force results as the crank advance angle;
   obtaining a virtual pedaling force based on the instant pedaling force, the peak pedaling force, and the crank advance angle; and
   determining the assist force based on the virtual pedaling force.

2. An electrically assisted bicycle assist force calculation method comprising:
   obtaining from a pedaling force sensor an instant pedaling force applied to a pedal;
   obtaining a crank advance angle of a crankshaft from an advance angle sensor having a resolution of less than 90°;
   determining an assist force based on at least the instant pedaling force and the crank advance angle;
   defining an advance angle amount of the crankshaft from an angle at which the instant pedaling force becomes a maximum point as the crank advance angle;
   setting the maximum point of the instant pedaling force as a peak pedaling force;
   obtaining a reference pedaling force from the peak pedaling force and the crank advance angle;
   obtaining a virtual pedaling force based on the instant pedaling force and the reference pedaling force; and
   determining the assist force based on the virtual pedaling force.

3. The method according to claim 2, further comprising:
   repeating a process of updating the peak pedaling force with a current instant pedaling force when the current instant pedaling force exceeds the reference pedaling force.

4. The method according to claim 2, further comprising:
   increasing a dependency of the reference pedaling force on the virtual pedaling force as the peak pedaling force increases.

5. The method according to claim 2, further comprising:
   decreasing a dependency of the reference pedaling force on the virtual pedaling force as the peak pedaling force increases.

6. The method according to claim 2, further comprising:
   increasing a dependency of the instant pedaling force on the virtual pedaling force as a pedaling cadence decreases.

7. The method according to claim 2, further comprising:
   decreasing a dependency of the instant pedaling force on the virtual pedaling force as a pedaling cadence decreases.

8. The method according to claim 2, further comprising:
   controlling the reference pedaling force to be 50% or less of the peak pedaling force while the crank advance angle stays between 90° or more to 1080° or less when the current instant pedaling force does not exceed the reference pedaling force every time the crank advance angle advances a predetermined angle.

9. An electrically assisted bicycle controller for an electrically assisted bicycle in which an assist force is generated by an electric motor, the controller being configured or programmed to:

obtain an instant pedaling force from a pedaling force sensor;

obtain a crank advance angle from an advance angle sensor that obtains a crank advance angle sensor output of a crankshaft and has a resolution of less than 90°;

determine an assist force based on the instant pedaling force and the crank advance angle;

set a maximum point of the instant pedaling force as a peak pedaling force;

define an advance angle amount of the crankshaft from an angle at which the peak pedaling force results as the crank advance angle;

obtain a virtual pedaling force based on the instant pedaling force, the peak pedaling force, and the crank advance angle; and determine the assist force based on the virtual pedaling force.

10. A power unit comprising:

the controller according to claim 9; and an electric motor that generates the assist force determined by the controller in a drive wheel.

11. An electrically assisted bicycle comprising:

the power unit according to claim 10; and the drive wheel to which the assisted force is imparted by the power unit.

* * * * *